US 9,958,058 B2

(12) United States Patent
Burato et al.

(10) Patent No.: US 9,958,058 B2
(45) Date of Patent: May 1, 2018

(54) BAR-END ELECTRIC ACTUATION DEVICE OF A BICYCLE GEARSHIFT

(71) Applicant: Campagnolo S.r.l., Vicenza (IT)

(72) Inventors: Luca Burato, Montecchia di Crosara (IT); Maurizio Valle, Castelgomberto (IT)

(73) Assignee: Campagnolo S.r.l., Vicenza (IT)

( * ) Notice: Subject to any disclaimer, the term of this patent is extended or adjusted under 35 U.S.C. 154(b) by 88 days.

(21) Appl. No.: 13/868,475

(22) Filed: Apr. 23, 2013

(65) Prior Publication Data
US 2013/0276568 A1 Oct. 24, 2013

(30) Foreign Application Priority Data

Apr. 23, 2012 (EP) .................................. 12002844

(51) Int. Cl.
B62K 27/08 (2006.01)
F16H 59/04 (2006.01)
B62M 25/08 (2006.01)
B62K 23/02 (2006.01)
H01H 9/06 (2006.01)

(52) U.S. Cl.
CPC ........... *F16H 59/044* (2013.01); *B62K 23/02* (2013.01); *B62K 27/08* (2013.01); *B62M 25/08* (2013.01); *H01H 2009/066* (2013.01); *Y10T 74/2003* (2015.01)

(58) Field of Classification Search
CPC . B62M 25/04; B62K 23/02; H01H 2009/066; H01H 9/06; H01H 3/168; F16H 59/0217; F16H 59/0278; F16H 59/10; F16H 59/044; F16H 2059/028

USPC ....................... 74/473.12, 473.33; 200/61.88
See application file for complete search history.

(56) References Cited

U.S. PATENT DOCUMENTS

| 6,073,730 A | 6/2000 | Abe |
| 7,392,723 B2 | 7/2008 | Tsumiyama |
| 2002/0187867 A1 | 12/2002 | Ichida et al. |
| 2007/0012137 A1 | 1/2007 | Dal Pra' |

(Continued)

FOREIGN PATENT DOCUMENTS

| CN | 1515447 A | 7/2004 |
| CN | 1883999 A | 12/2006 |

(Continued)

OTHER PUBLICATIONS

European Search Report for Application No. 12002844.4-1254.
(Continued)

*Primary Examiner* — Ahmed Saeed
(74) *Attorney, Agent, or Firm* — Volpe and Koenig, P.C

(57) ABSTRACT

The bar-end electric actuation device of a bicycle gearshift, comprising a body suitable for being mounted at an end of handlebars facing forwards in the direction of travel (X) of the bicycle and a first and a second electric actuation member acting on respective electrical contacts which are mounted in the body and are suitable for controlling gearshifting, upwards and downwards respectively. The first and the second electric actuation member are faced by said body according to a respective facing direction, angularly spaced apart by an angle (α) that is between 60° and 130°. Moreover, the body is suitable for being positioned externally around the end of the handlebars, leaving free access to the inside of the end itself.

17 Claims, 11 Drawing Sheets

(56) References Cited

U.S. PATENT DOCUMENTS

| | | | |
|---|---|---|---|
| 2008/0210046 A1 | 9/2008 | DePerini | |
| 2010/0270135 A1* | 10/2010 | Murasawa | B60K 20/06 200/61.88 |
| 2011/0011197 A1 | 1/2011 | Oku et al. | |
| 2013/0151073 A1 | 6/2013 | Tetsuka | |

FOREIGN PATENT DOCUMENTS

| | | |
|---|---|---|
| CN | 1927650 A | 3/2007 |
| DE | 202011004673 U1 | 6/2011 |
| EP | 1262399 A1 | 12/2002 |
| EP | 1669286 A2 | 6/2006 |
| EP | 1808367 A2 | 7/2007 |
| EP | 2105377 A2 | 9/2009 |
| EP | 2253531 A1 | 11/2010 |
| EP | 2275338 A1 | 1/2011 |
| JP | 2003048593 A2 | 2/2003 |
| JP | 2004182053 A | 7/2004 |
| JP | 2008213831 A | 9/2008 |

OTHER PUBLICATIONS

Chinese Office Action with English translation, Chinese Patent Application No. 201310144344.5, dated Dec. 25, 2015, 19 pgs.
Japanese Office Action with English translation, Japanese Patent Application No. 2013-089213, dated Nov. 15, 2016.
Japanese Decision of Grant for JP2013-089213, dated Nov. 7, 2017.

* cited by examiner

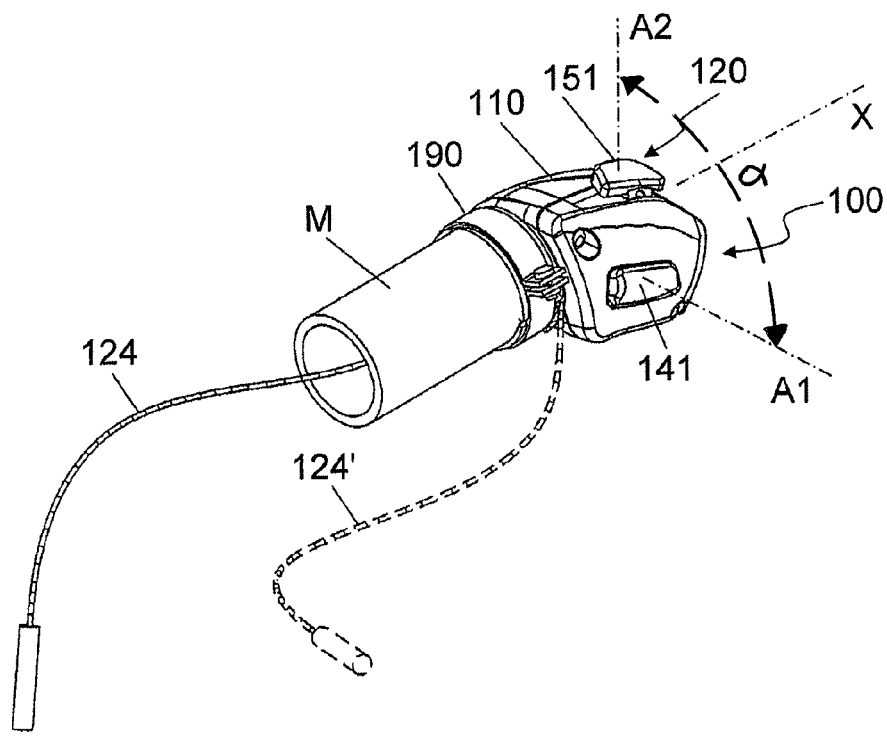
FIG. 1
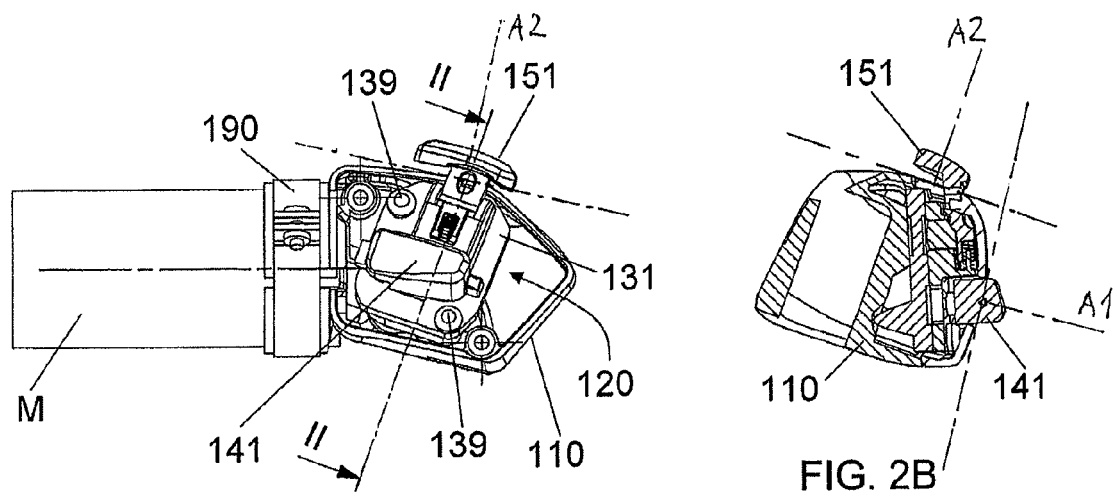
FIG. 2A
FIG. 2B

BAR-END ELECTRIC ACTUATION DEVICE OF A BICYCLE GEARSHIFT

FIELD OF INVENTION

The present invention refers, in general to the technical field of actuation devices of a bicycle gearshift. More specifically, the present invention refers to a bar-end electric actuation device of a bicycle gearshift.

BACKGROUND

It is well-known that in bicycles intended for racing there is a constant search for solutions to improve performance. In particular, for bicycles intended for speed races, such as typically a time trial, a good aerodynamic configuration of all of the components of the bicycle is particularly important. Moreover, a factor that is considered to improve performance is not just the efficiency of all of the controls but also their ease and safety of actuation, so that the cyclist is put in a position to be able to concentrate on the physical effort without hindrances due to difficulties in actuating the controls.

Recently, specialised handlebars for races have become well-established, which have two ends facing markedly forwards, which allow the cyclist to maintain a torso position greatly leaning forwards, which is aerodynamically efficient.

With these handlebars, specific actuation devices, both for the brakes and for the gearshifts, have also become well-established; these devices are commonly called bar-end since they are housed right at the ends of the handlebars, so that the cyclist can easily actuate them without having to change his position.

There are also known electric actuation devices for gearshifts, in which the cyclist must actuate—for each gearshift—a first switch to command upward gearshifting and a second switch for downward gearshifting. Typically, the first and the second switch are adjacent.

A bar-end type electric actuation device of the gearshift is described in EP A2 2105377. This device provides a body, which forms an ideal extension of the cylindrical tube of the handlebars, and a first and a second electric actuation element of the gearshift adjacent to and projecting laterally from the body. Since the two actuation elements are arranged adjacent to one another, they may be actuated accidentally, for example in the case of travel on uneven ground. This, of course, is undesirable during a sports competition. Secondarily, for example in the case in which the electric actuation elements of the gearshift face in opposite lateral directions of the body described in EP A2 2105377, in order to command upward gearshifting and downward gearshifting the cyclist must not only use two fingers, typically the thumb and the index finger, but he must also perform movements that can easily force him to release or at least alter his grip on the handlebars. All of this complicates the actuation of the gearshift, with consequent undesirable reduction of the ability to concentrate on the physical effort.

The Applicant has realised that it is possible to improve the overall efficiency of an actuation device of the gearshift of this type, by designing it specifically to allow each cyclist to take up the most suitable hand position, and to maintain the position substantially unchanged during the actuation of the device.

SUMMARY

The disclosure provides a bar-end electric actuation device for a bicycle gearshift that includes a body configured to be mounted at the end of the handlebar and facing forwards in the direction of travel. The body has two electrical contacts that are operated by actuation members to control gear shifting. The two electric actuation members are positioned on the body to face in different directions that angularly spaced by a predetermined angle ($\alpha$).

BRIEF DESCRIPTION OF THE DRAWINGS

Further characteristics and advantages of the invention will become clearer from the following description of preferred embodiments thereof, made with reference to the attached drawings. In such drawings:

FIG. 1 is a perspective view of a bar-end electric actuation device of a bicycle gearshift according to a first embodiment of the invention, mounted on an end of handlebars;

FIG. 2A is a side view of the device of FIG. 1 with parts removed to show the internal components;

FIG. 2B is a section view of the device of FIG. 2A, taken according to the line II-II of FIG. 2A;

DETAILED DESCRIPTION

Introduction

Figure 3:
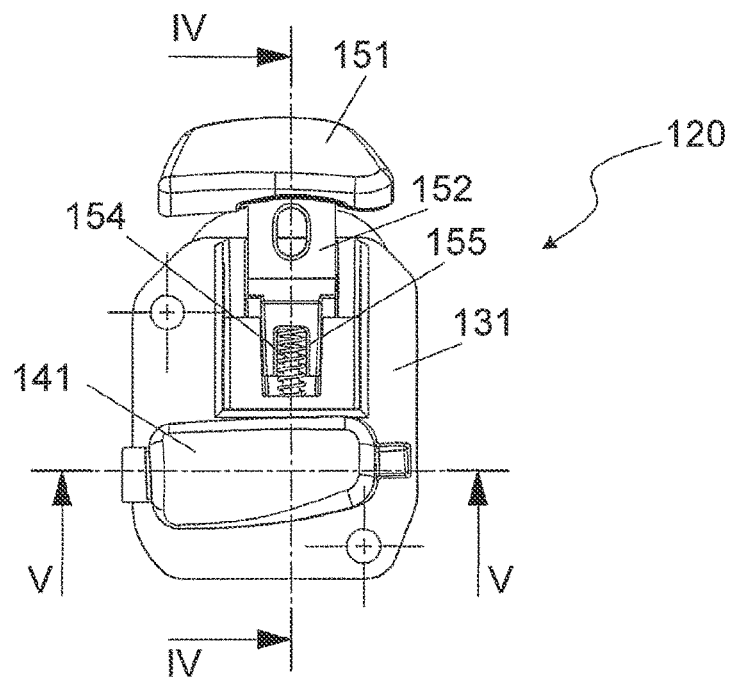
FIG. 3 is a side view of the electric actuation members of the device of FIG. 1.

The bar-end electric actuation device of a bicycle gearshift comprises a body suitable for being mounted at an end of handlebars facing forwards in the direction of travel of the bicycle and two electric actuation members acting on respective electrical contacts that are mounted in the body and are suitable for commanding gear shifting, upward and downward respectively, and it is characterised in that the two electric actuation members are faced from the body in respective facing directions angularly spaced apart by an angle ($\alpha$) between 60 and 130°.

In the present description and in the following claims, by the expression "facing direction" it is meant to indicate a direction perpendicular to the surface tangent to the body at the electric actuation member. If the extension of the actuation member is so great that the tangent plane varies significantly from one point to the other of the actuation member, the tangent plane must be considered at a barycentric position of the actuation member.

As a result of this, advantageously, the two actuation members are sufficiently spaced apart as to be distinguishable and not able to be actuated accidentally, typically in the case of riding on uneven ground.

Preferably, the angle between the two facing directions of the two electric actuation members by the body is comprised between 75 and 110°, even more preferably between 85 and 100°. Such an angle proved to be an excellent compromise: indeed, it proved to be small enough to ensure easy actuation, without requiring substantial variations in grip, but it is also big enough to reduce the risk of mistaken actuation.

According to a preferred embodiment of the invention, one of said facing directions faces laterally, substantially perpendicular to the direction of travel of the bicycle.

According to a preferred embodiment of the invention, one of said facing directions faces upwards, substantially perpendicular to the direction of travel of the bicycle.

According to a preferred embodiment of the invention, one of said facing directions faces in the direction of travel of the bicycle.

According to a preferred embodiment of the invention, one of said facing directions faces downwards, substantially perpendicular to the direction of travel of the bicycle.

In a preferred embodiment, one of the two electric actuation members is in a facing direction facing laterally, substantially perpendicular to the direction of travel of the bicycle and the other of the two electric actuation members is in a facing direction facing upwards, substantially perpendicular to the direction of travel of the bicycle.

In another preferred embodiment, one of the two electric actuation members is in a facing direction facing laterally, substantially perpendicular to the direction of travel of the bicycle and the other of the two electric actuation members is in a facing direction facing in the direction of travel of the bicycle.

In yet another preferred embodiment, one of the two electric actuation members is facing upwards, substantially perpendicular to the direction of travel of the bicycle and the other of the two electric actuation members is facing in the direction of travel of the bicycle.

In yet another preferred embodiment, one of the two electric actuation members is facing laterally, substantially perpendicular to the direction of travel of the bicycle and the other of the two electric actuation members is facing direction facing downwards, substantially perpendicular to the direction of travel of the bicycle.

In all of the aforementioned embodiments, the cyclist can obtain gear shifting without much altering of the grip on the device, by simply slightly moving the same digit, preferably the thumb or the index finger, or using the thumb for one actuation member and the index finger for the other, so as to actuate one or the other of the two electric actuation members. Given their position, indeed, the electric actuation members cannot be actuated simultaneously by the same digit and this advantageously prevents their accidental actuation.

Preferably, each of said electric actuation members can be actuated from a neutral position to an actuation position according to a respective actuation direction, in contrast to a respective spring.

In a preferred embodiment, one of said electric actuation members is mounted on the body free to slide in the actuation direction.

In a preferred embodiment, one of said electric actuation members is mounted on the body free to rotate about a respective pin arranged so that the actuation direction substantially coincides with the facing direction of the body.

In a preferred embodiment, one of said electric actuation members is mounted on the body free to rotate about a respective pin arranged so that the actuation direction is substantially perpendicular to the facing direction of the body.

In a preferred embodiment, the body comprises a band for locking onto the end of the handlebars.

In another preferred embodiment, the body comprises an expander for mounting on the end of the handlebars inside it, said expander comprising splayable sectors and a free angular space.

In a second aspect, the invention concerns a bar-end electric actuation device of a bicycle gearshift, comprising a body suitable for being mounted at a tubular end of handlebars facing forwards in the direction of travel of the bicycle and electric actuation members mounted on the body, each of said members being suitable for commanding gearshifting, and characterised in that the body comprises a cylindrical through seat having an axis that when the device is mounted on the handlebars extends in the direction of travel of the bicycle, said cylindrical seat being configured so as to allow the positioning of the body externally around the tubular end of the handlebars and to leave free access to the inside of the tubular end itself.

It is thus possible to use a device according to the invention for the actuation of the gearshift, together with an independent braking device.

In a preferred embodiment, the body extends in the direction of the axis (S) of the cylindrical through seat substantially as far as the cylindrical seat itself. Alternatively, the body extends in the direction of the axis (S) of the cylindrical through seat substantially farther than the cylindrical seat itself, so as to be canti-levered. A cyclist may prefer the first or the second of these embodiments according to the cyclist's hand size; clearly, the first is more suitable for cyclists with large hands, the second for cyclists with small hands, given the possibility of mounting the braking device closer to the actuation members of the actuation device of the gearshift.

DETAILED DESCRIPTION OF PREFERRED EMBODIMENT(S)

It should be noted that the devices described and illustrated are intended for the left end of handlebars; symmetrically identical devices (not illustrated) are provided for the right end of the same handlebars.

FIGS. 1, 2A and 2B show an electric actuation device 100 of a gearshift for a competition bicycle (not shown), in particular for races, according to a first embodiment of the invention.

The device 100 is a so-called bar-end device, mounted on the end M of bicycle handlebars of the type used on competition bicycles, and even more in particular specialized bicycles for time trials; in such handlebars, the end M faces forwards, with respect to the direction of travel X of the bicycle. The same handlebars will also normally be provided with conventional ends, i.e. not facing forwards, to also give the cyclist the possibility of a traditional grip.

The device 100 comprises a body 110, configured for being mounted at the end M of handlebars, and an electric actuation unit 120 housed in the body 110. The body 110 also carries a band 190 for fixing the device 100 to the end M of the handlebars.

With particular reference to FIGS. 3 to 6, the electric actuation unit 120 comprises two electrical contacts 121 and 122, mounted on a plate 123 and connected to a multi-conductor electric cable 124 (FIG. 1), and two electric actuation members carried by a support plate 131: a first electric actuation member 141 and a second electric actuation member 151. The cable 124 is provided for mounting inside the end of handlebars M; FIG. 1 also shows, with a broken line, an alternative solution, with a cable 124' provided for mounting outside of the end of handlebars M, The plate 123 and the support plate 131 are coupled on the body 110 of the device 100 with screws 139 (FIG. 2A).

A pair of springs 142 is mounted between the first electric actuation member 141 and the support plate 131, to keep the first electric actuation member 141 elastically in a neutral position thereof, when not biased by the cyclist for gear shifting. In particular, each spring 142 is housed in a respective seat 143 formed in a corresponding projection 144 extending from the support plate 131, on the opposite side to that for coupling with the plate 123. Each projection 144, with the spring 142 associated with it, is suitable for being received in a respective cavity 145 formed in the first electric actuation member 141.

In the first electric actuation member 141 there is a further cavity 146, preferably arranged between the pair of cavities 145, suitable for receiving a first abutment 147 acting on the respective electrical contact 121 through an opening 148 formed on the support plate 131 to command gear shifting.

The second electric actuation member 151 comprises a slide 152 suitable for sliding inside a guide seat 153 also extending on the support plate 131 on the opposite side to that for mounting on the plate 123.

Figure 4:
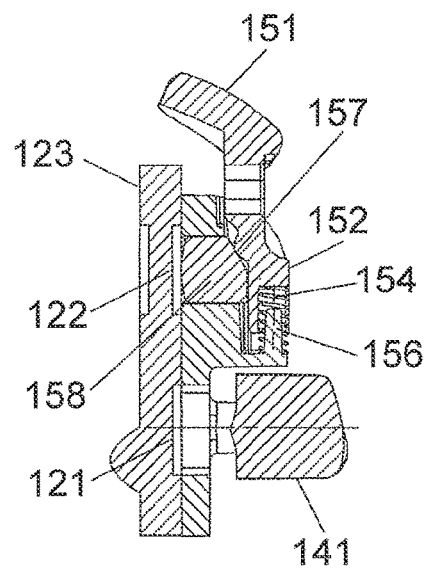
FIG. 4 is a cross section view taken along the line IV-IV of FIG. 3.
Figure 5:
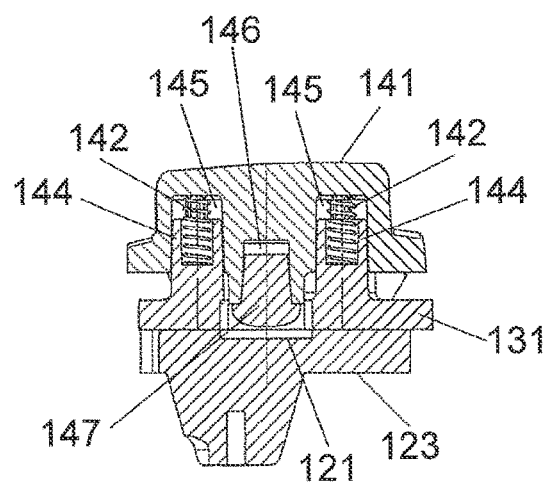
FIG. 5 is a cross section view taken along the line V-V of FIG. 3.
Figure 6:
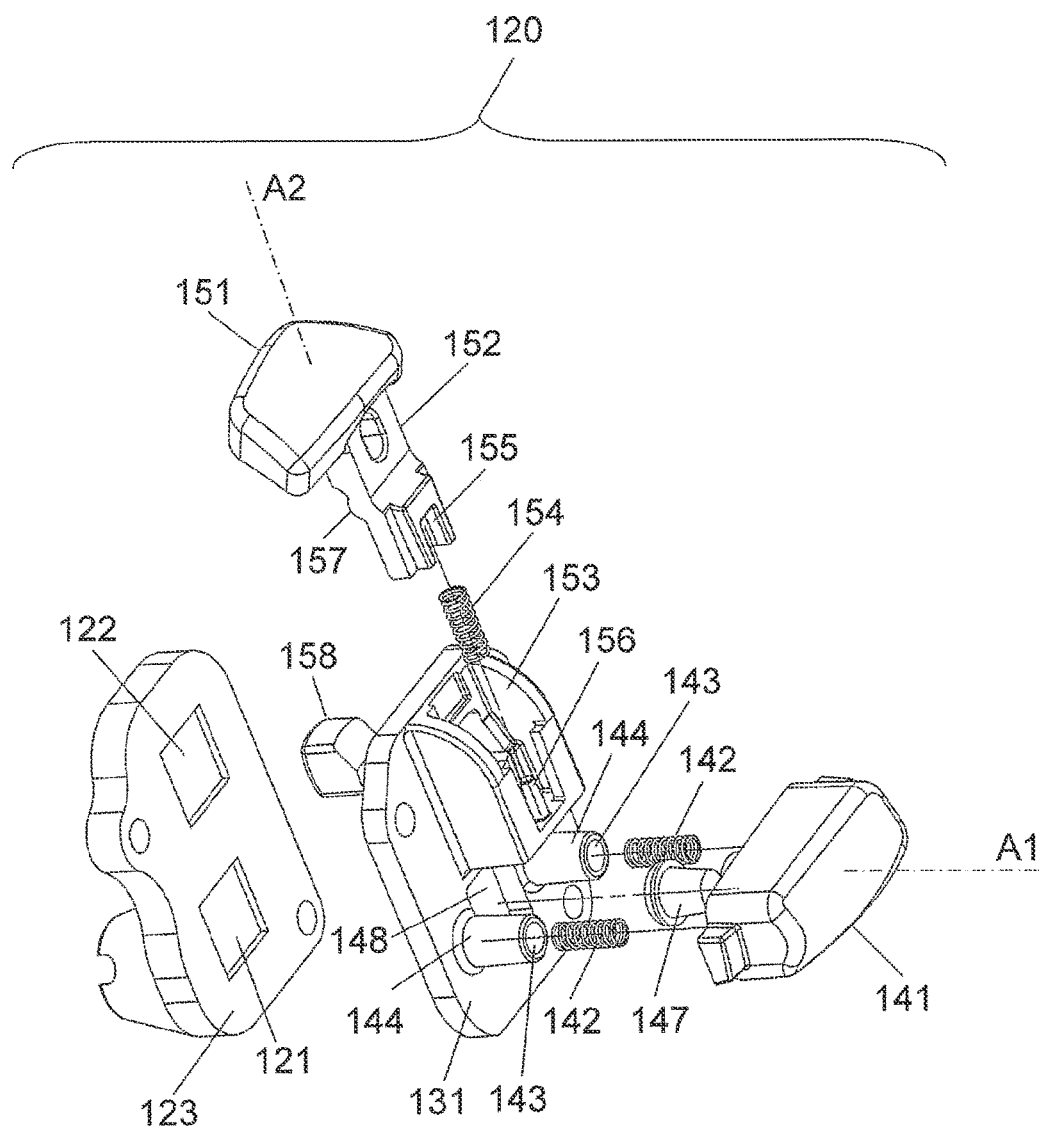
FIG. 6 is an exploded perspective view of the electric actuation members of FIG. 3.
Figure 7:
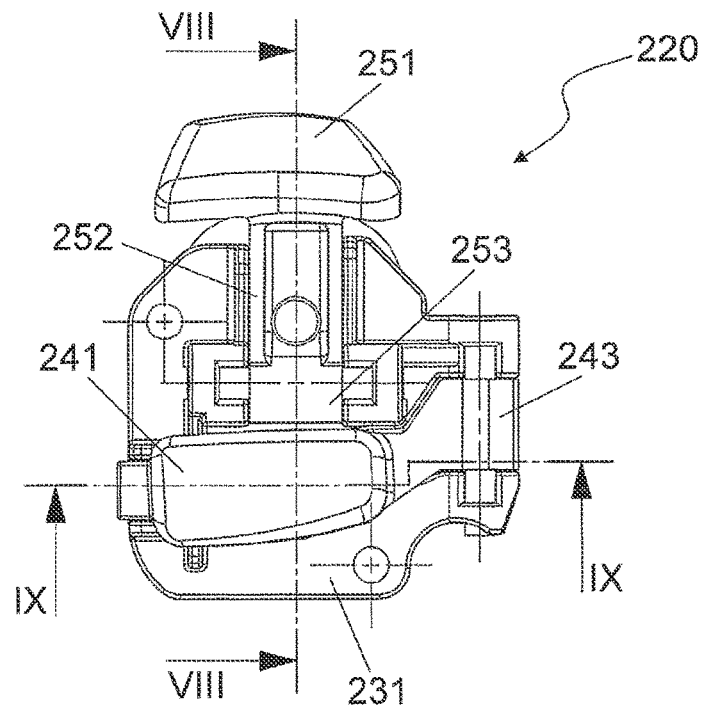
FIG. 7 is a side view of a variant of the electric actuation members of the device of FIG. 1.

A spring 154 is mounted between the second actuation member 151, see FIGS. 3 and 4, and the support plate 131, to keep the second electric actuation member 151 elastically in a neutral position thereof, when not biased by the cyclist for gearshifting, for example upward. In particular, the spring 154 is mounted between a cavity 155 formed in the slide 152 and a pin 156 projecting upwards from the bottom of the guide seat 153.

The slide 152 also has an inclined projection 157, suitable for acting on a second abutment 158, which is slidably mounted on the support plate 131, extends from the support plate 131 towards the plate 123 and is active on the respective electrical contact 122, to command gear shifting.

As shown in FIG. 1, the first electric actuation member 141 and the second actuation member 151 are facing from the body 110 in two directions, angularly spaced apart by an angle (α) comprised between 60 and 130°, preferably between 75 and 110°, even more preferably between 85 and 100°. More specifically, in the mounted position of FIG. 1, the first electric actuation member 141 faces from the body 110 according to a facing direction A1 facing laterally, substantially perpendicular to the direction of travel X of the bicycle, whereas the second actuation device 151 faces from the body 110 according to a facing direction A2 facing upwards, substantially perpendicular to the direction of travel X of the bicycle. As already mentioned above, the facing directions A1, A2 are the directions perpendicular to the surface tangent to the body 110 at the electric actuation member 141, 151, when the latter is in the rest position illustrated in the figures. The directions A1 and A2 thus cross the outer surface of the body 110, at the electric actuation members 141, 151, respectively.

FIGS. 7 to 10 illustrate a variant of the electric actuation unit of the device 100 of the invention, indicated in general with reference numeral 220.

The electric actuation unit 220, in totally the same way as the electric actuation unit 120, comprises the two electrical contacts 121 and 122, mounted on the plate 123 and connected to the multi-conductor electric cable 124 (FIG. 1), and a first electric actuation member 241 and a second electric actuation member 251 carried by a support plate 231.

Figure 9:
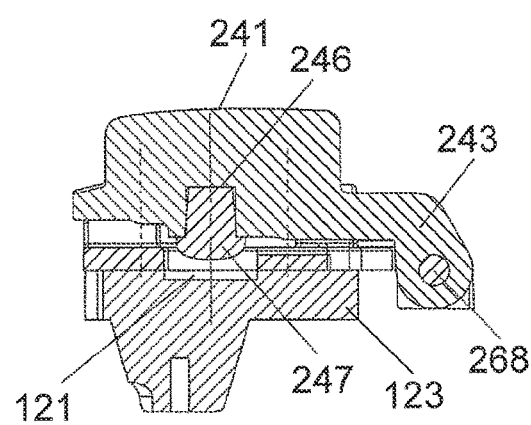
FIG. 9 is a cross section view taken along the line IX-IX of FIG. 7.
Figure 10:
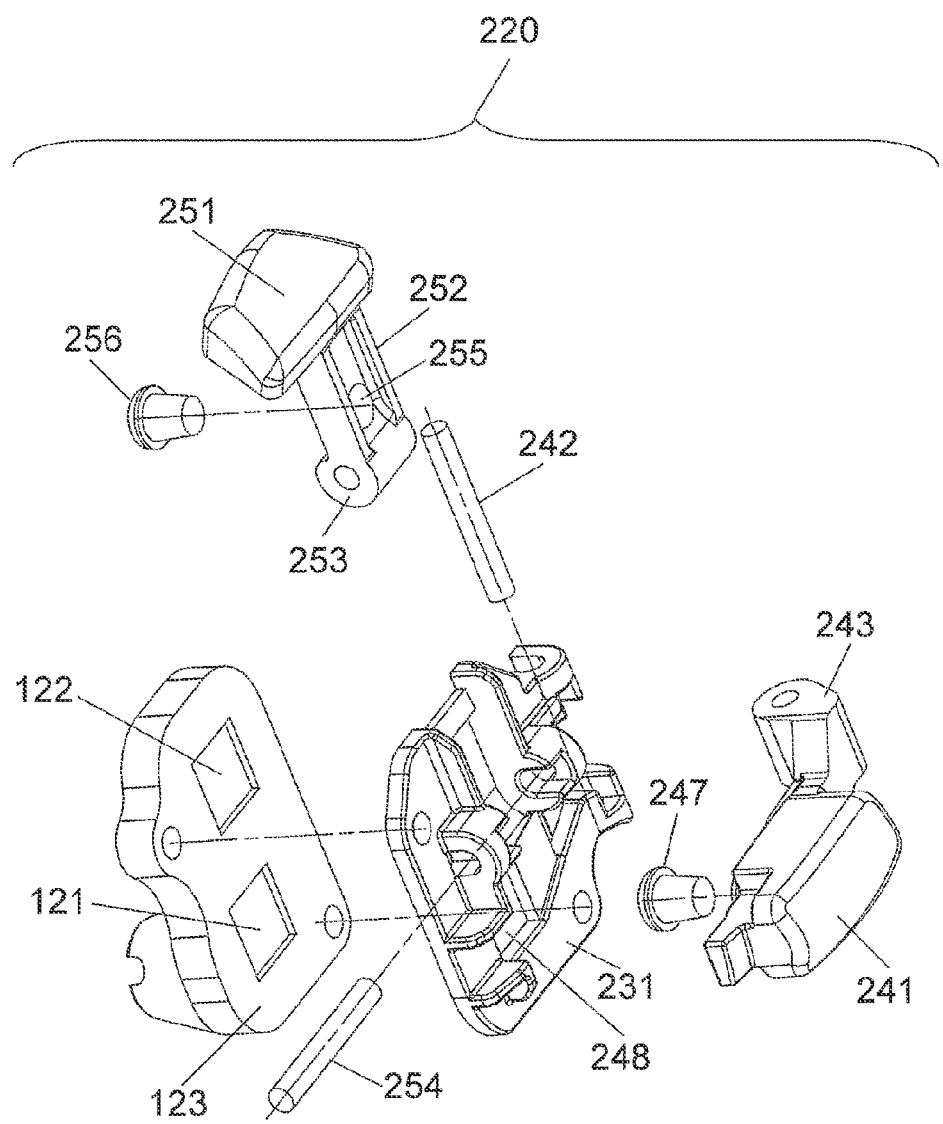
FIG. 10 is an exploded perspective view of the electric actuation members of FIG. 7.

With reference to FIGS. 9 and 10, the first electric actuation member 241 has a projection 243 for hinging, through a first pin 242, to the support plate 231, on the opposite side with respect to that for coupling with the plate 123. The first electric actuation member 241 also has a cavity 246, suitable for receiving a first abutment 247 acting on the respective electrical contact 121 through an opening 248 formed on the support plate 231, to command gearshifting, for example upward.

Figure 8:
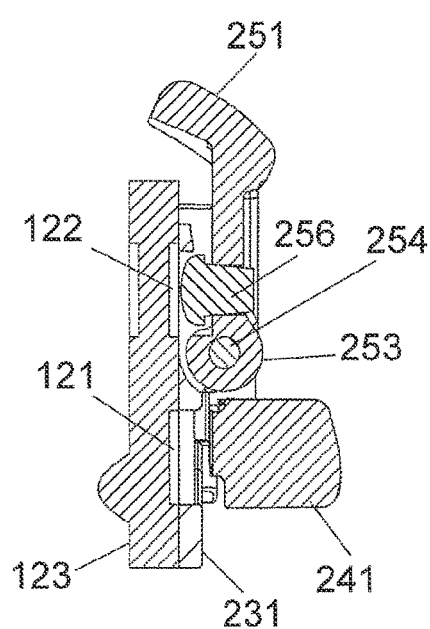
FIG. 8 is a cross section view taken along the line VIII-VIII of FIG. 7.

With reference to FIGS. 8 and 10, the second electric actuation member 251 comprises a tang 252 hinged at an end portion 253 thereof, through a second pin 254, to the support plate 231, on the opposite side to that for coupling with the plate 123. The tang 252 has a seat 255 for housing a second abutment 256, acting on the respective electrical contact 122, to command gearshifting, for example downward.

Figure 11:
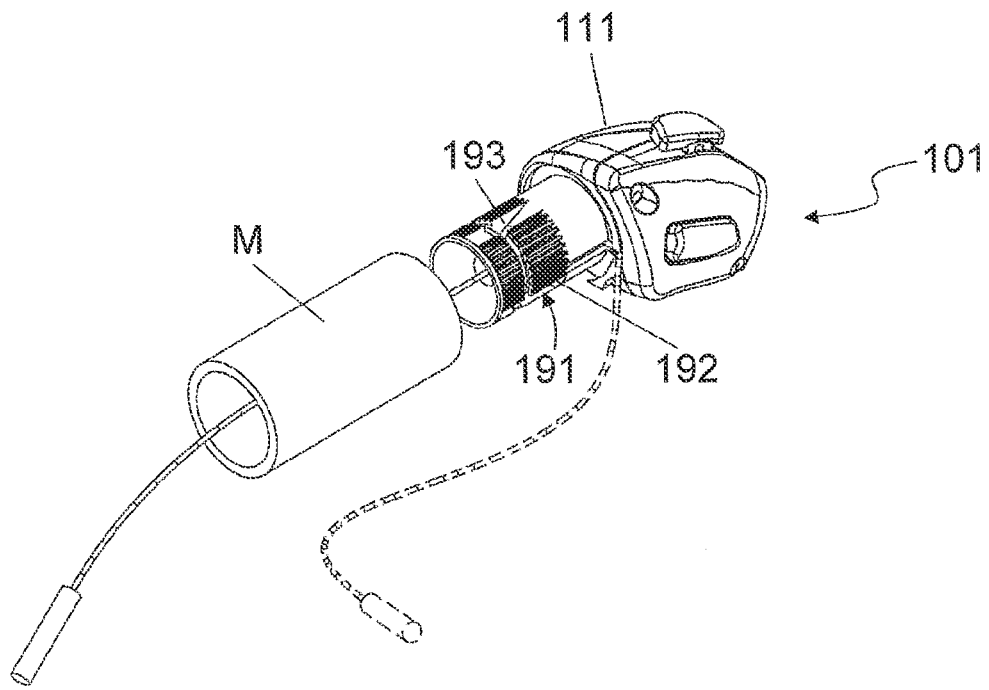
FIG. 11 is a perspective view of a first variant of the device of FIG. 1, before it is mounted on an end of handlebars.

FIG. 11 shows a first variant 101 of the electric actuation device according to the embodiment described above. The device 101 differs from the device 100 solely in that it comprises, instead of the band, an expander 191 (per se known and not described in detail) mounted on a body 111 for fixing inside the end M of handlebars. The expander 191 comprises splayable sectors 192 and a free angular space 193 between the sectors 192. All of the other characteristics are identical to those of the device 100 and therefore are neither described nor illustrated in detail.

Figure 12:
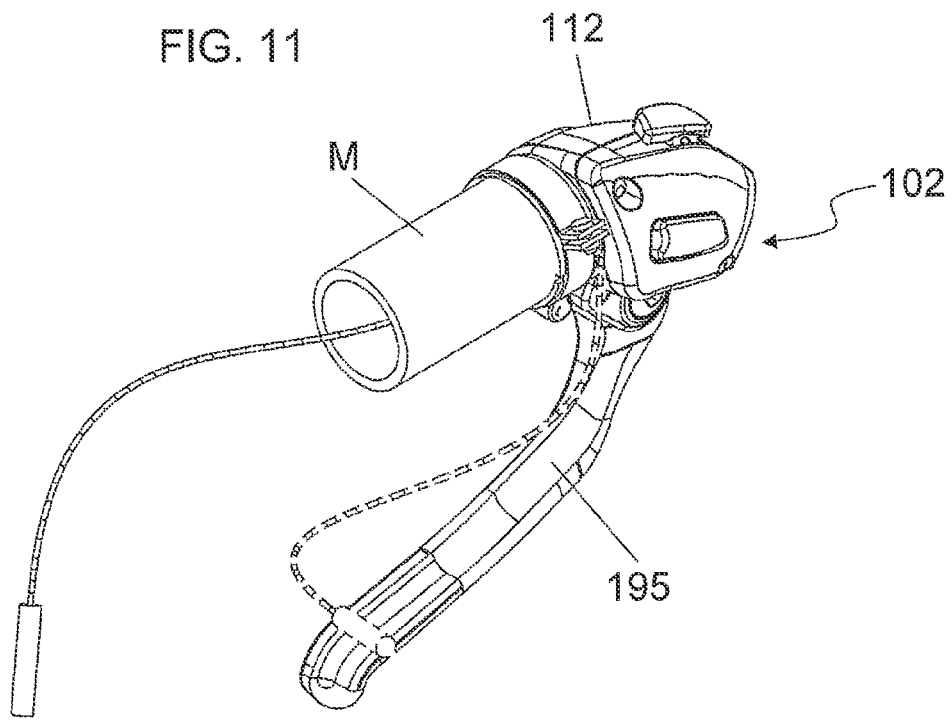
FIG. 12 is a perspective view of a second variant of the device of FIG. 1.

FIG. 12 shows a second variant 102 of the electric actuation device according to the embodiment described above. The device 102 differs from the device 100 solely in that it includes a brake lever 195 rotatably supported by a body 112. All of the other characteristics are identical to those of the device 100 and therefore are neither described nor illustrated in detail.

Figure 13:
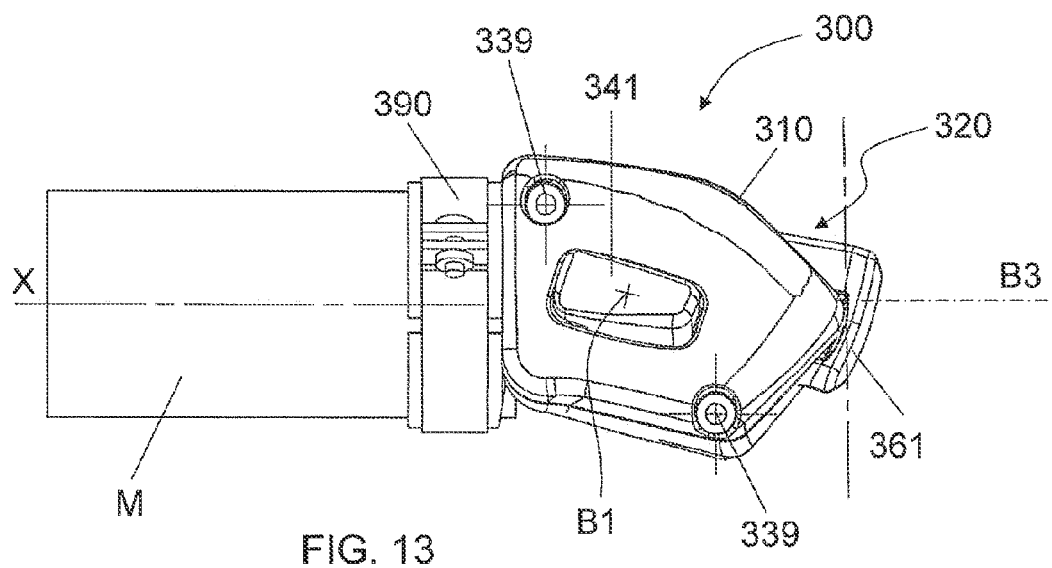
FIG. 13 is a side view of an electric actuation device according to a second embodiment of the invention, mounted on an end of handlebars.

FIG. 13 shows an electric actuation device 300 of a gearshift of a competition bicycle (not shown), in particular for races, according to a second embodiment of the invention.

The device 300 comprises a body 310, suitable for being mounted at the end M of handlebars, and an electric actuation unit 320 fixed inside the body 310 with screws 339 and comprising a first and a second electric actuation member, 341 and 361 respectively. The body 310 carries a band 390 for fixing the device 300 to the end M of the handlebars.

The device 300 differs from the device 100, and from its variants 101 and 102, for the different facing directions of the electric actuation members 341 and 361 from the body 310. In particular, in the mounted position of FIG. 13, the first electric actuation member 341 faces from the body 310 according to a facing direction B1 facing laterally, substantially perpendicular to the direction of travel X of the bicycle, whereas the second actuation device 361 faces from the body 110 according to a facing direction B3 substantially coinciding with the direction of travel X of the bicycle.

Figure 14:
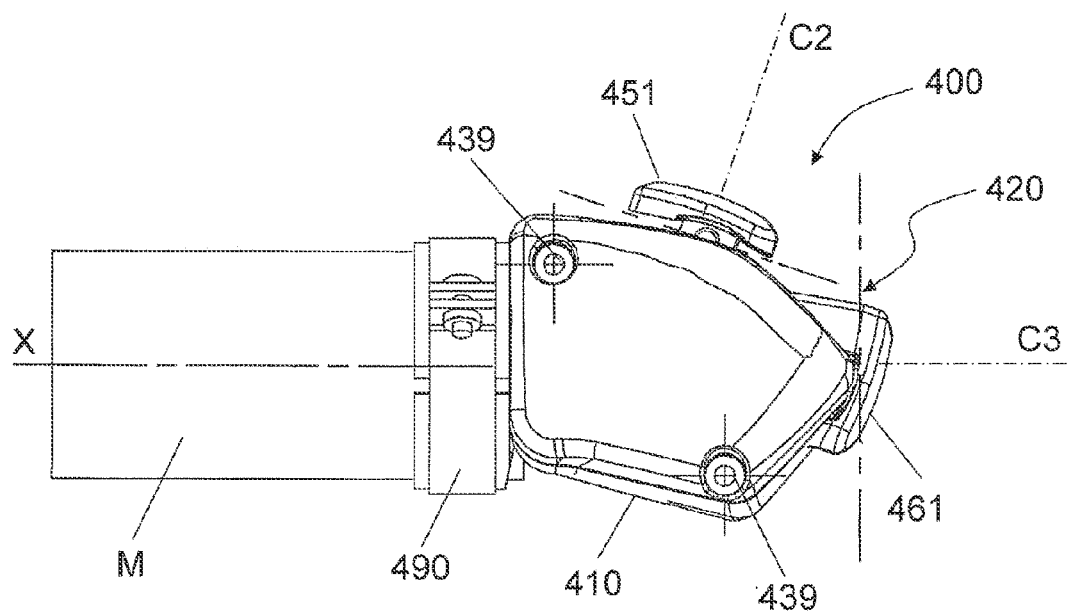
FIG. 14 is a side view of an electric actuation device according to a third embodiment of the invention, mounted on an end of handlebars.

FIG. 14 shows an electric actuation device 400 of a gearshift of a competition bicycle (not shown), in particular for races, according to a third embodiment of the invention.

The device 400 comprises a body 410, suitable for being mounted at the end M of handlebars, and an electric actuation unit 420 fixed inside the body 410 with screws 439 and comprising a first and a second electric actuation member, 451 and 461 respectively. The body 410 carries a band 490 for fixing the device 400 to the end M of the handlebars.

The device 400 differs from the device 100, and from its variants 101 and 102, for the different facing directions of the electric actuation members 451 and 461 from the body 410. In particular, in the mounted position of FIG. 14, the first electric actuation member 341 faces from the body 310 according to a facing direction C2 facing upwards, substantially perpendicular to the direction of travel X of the bicycle, whereas the second actuation device 461 faces from the body 410 according to a facing direction C3 substantially coinciding with the direction of travel X of the bicycle.

With reference to FIG. 1 the operation of the bar-end electrical actuation device 100 of a bicycle gearshift will now be described. Of course, what has been stated with reference to the device 100 is valid, with the expected minor changes, for its two variants 101 and 102 and for the alternative embodiments 300 and 400.

A cyclist who wants to carry out upward or downward gearshifting will act, with his digit, typically the thumb or the index finger, alternatively on the electric actuation members.

In the case in which the device 100 mounts the electric actuation unit 120 illustrated and described with reference to FIGS. 3 to 6, to command upward gear shifting, the cyclist exerts pressure on the first electric actuation member 141, causing it to move from the neutral position to an actuation position according to an actuation direction substantially coinciding with the facing direction A1 of the first electric actuation member 141 from the body 110.

The movement of the first electric actuation member 141 from the neutral position to the actuation position causes a compression of the springs 142 and a consequent movement of the first abutment 147, which acts on the electrical contact 121, which in turn transmits an electric upward gearshifting signal. The ways of managing this signal to obtain gearshifting are per se known in the field and will not be described.

Differently, to command downward gear shifting, the cyclist exerts pressure on the second electric actuation member 151, causing it to move from the neutral position to an actuation position according to an actuation direction substantially coinciding with the facing direction A2 of the second electric actuation member 151 from the body 110.

The movement of the second electric actuation member 151 from the neutral position to the actuation position causes sliding of the slide 152 in the guide seat 153, with consequent compression of the spring 154 and action of the projection 157 on the second abutment 158. The abutment 158 in turn acts on the electrical contact 122, which transmits an electric downward gearshifting signal. The ways of managing this signal to obtain gearshifting are per se known in the field and will not be described.

In the case in which the device 100 mounts the electric actuation unit 220 illustrated and described with reference to FIGS. 7 to 10, to command upward gear shifting, the cyclist acts on the first electric actuation member 241, causing it to rotate around the first pin 242 between the neutral position and an actuation position; the actuation direction of the first electric actuation member 241 substantially coincides with the facing direction A1 of the same first electric actuation member 141 from the body 110.

The rotation of the first actuation member 241 between the neutral position and the actuation position causes a movement of the first abutment 147, which acts on the electrical contact 121, which in turn transmits the electric upward gearshifting signal. The ways of managing this signal to obtain gearshifting are per se known in the field and will not be described.

Differently, to command downward gear shifting, the cyclist acts on the second electric actuation member 251, causing it to rotate around the second pin 254 between the neutral position and an actuation position; the actuation direction of the second electric actuation member 251 is substantially perpendicular to the facing direction A2 of the same second electric actuation member 251 from the body 110.

The rotation of the second actuation member 241 between the neutral position and the actuation position causes a movement of the second abutment 256, which acts on the electrical contact 122, which in turn transmits an electric downward gearshifting signal.

Thanks to the particular operation of the device 100 (or 101 or 102 or 300 or 400), the cyclist can, using the same digit, for example the thumb, command upward or downward gearshifting maintaining an aerodynamically favourable position of the grouping of the hand and the device. Moreover, the cyclist can substantially maintain such a position during any gearshifting, because to obtain the desired gearshifting, it will be sufficient to slightly rotate the thumb so as to take it to the first or second actuation member, pressing it or rotating it to obtain the desired gearshifting.

Moreover, since the two actuation members are sufficiently spaced apart, they are advantageously distinguishable and cannot be actuated accidentally, typically in the case of riding on uneven ground.

Figure 15:
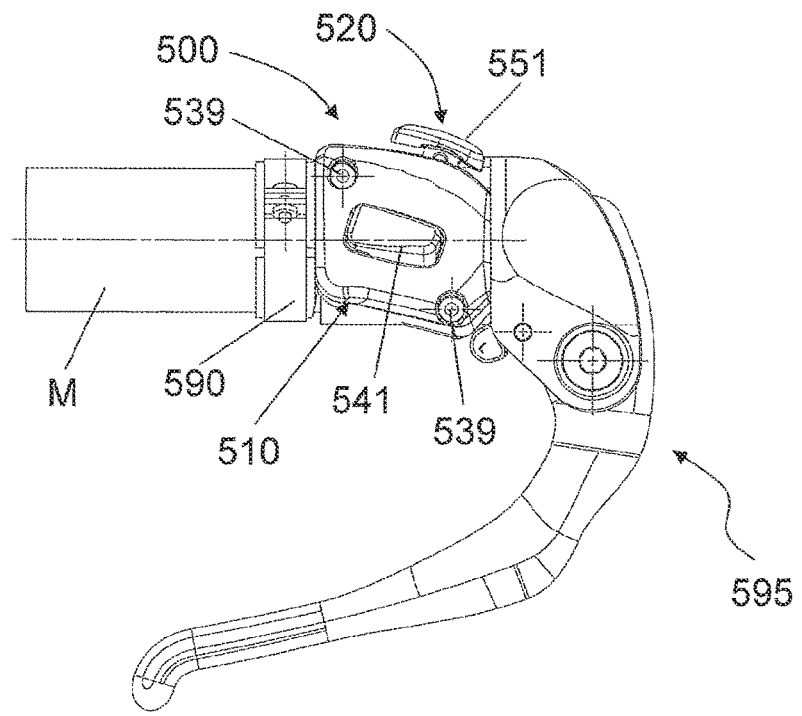
FIG. 15 is a side view of an electric actuation device according to a fourth embodiment of the invention, mounted on an end of handlebars together with a brake lever.
Figure 16:
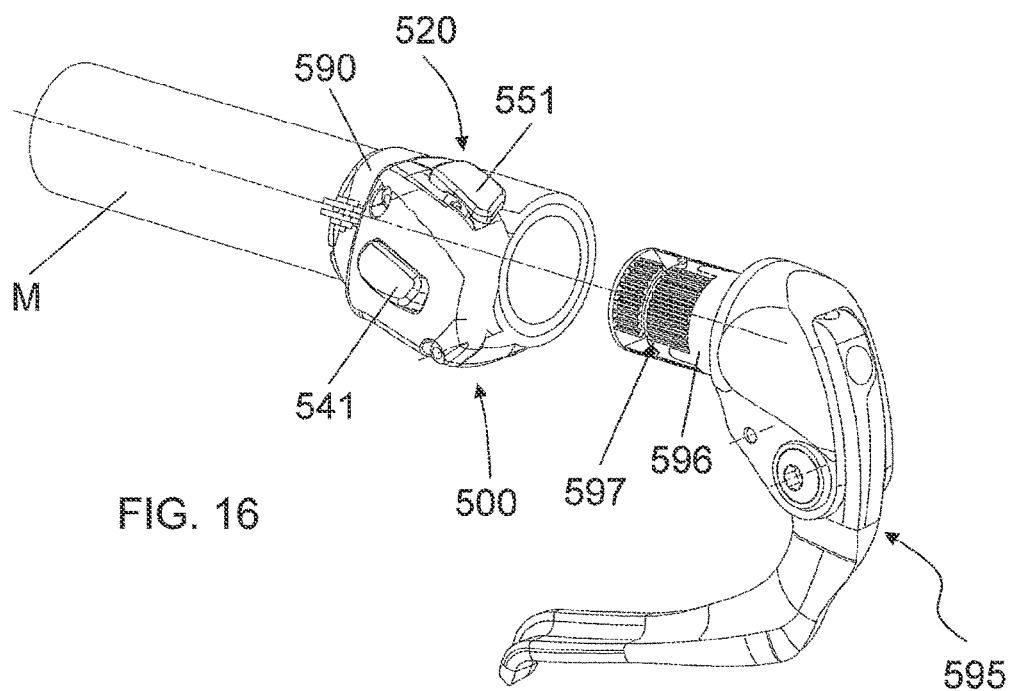
FIG. 16 is a perspective view of the device of FIG. 15, before mounting the brake lever on the end of handlebars.
Figure 17:
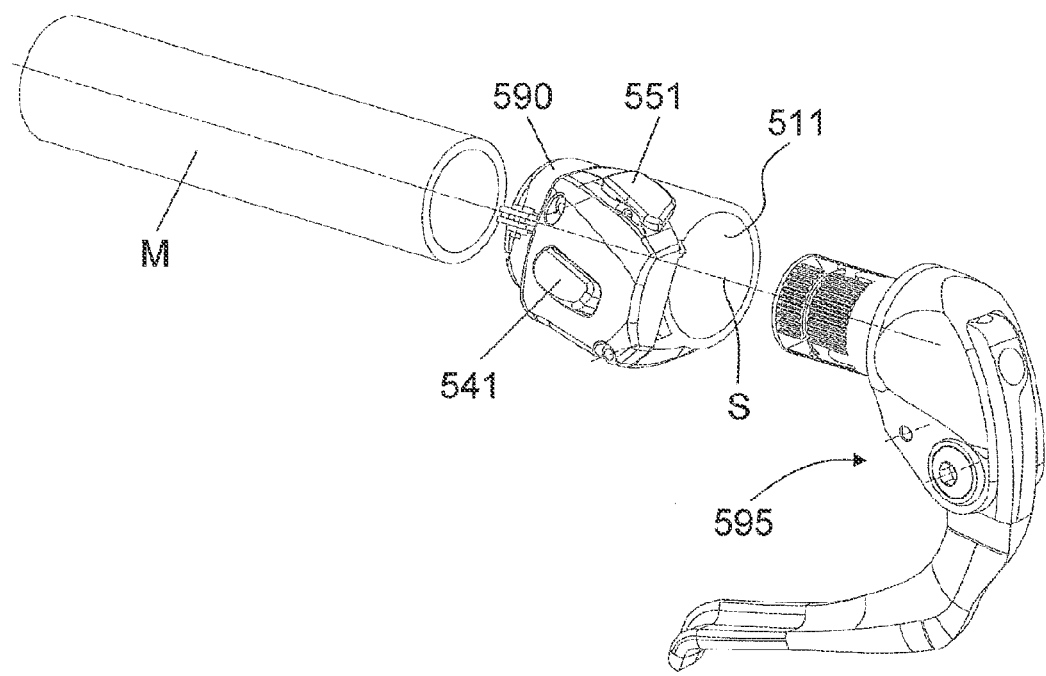
FIG. 17 is an exploded perspective view of the device of FIG. 15.
Figure 19:
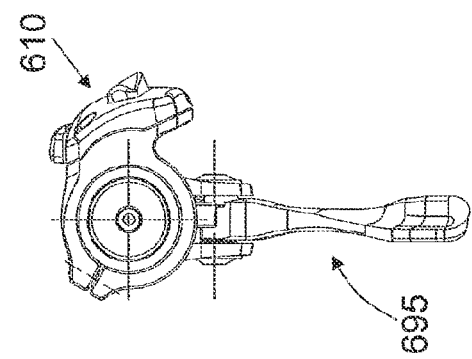
FIG. 19 is a view from the left of the device of FIG. 18.
Figure 18:
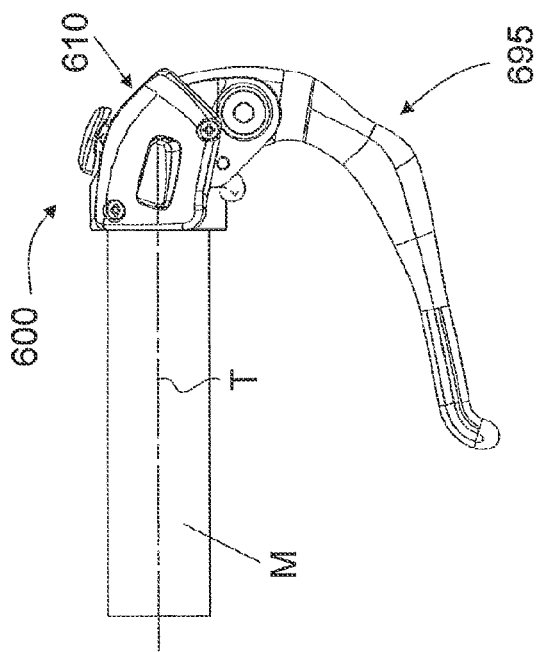
FIG. 18 is a side view of an electric actuation device according to a fifth embodiment of the invention.
Figure 20:
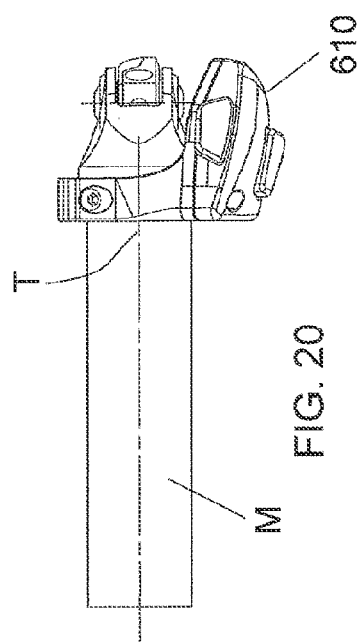
FIG. 20 is a view from above of the device of FIG. 18.
Figure 21:
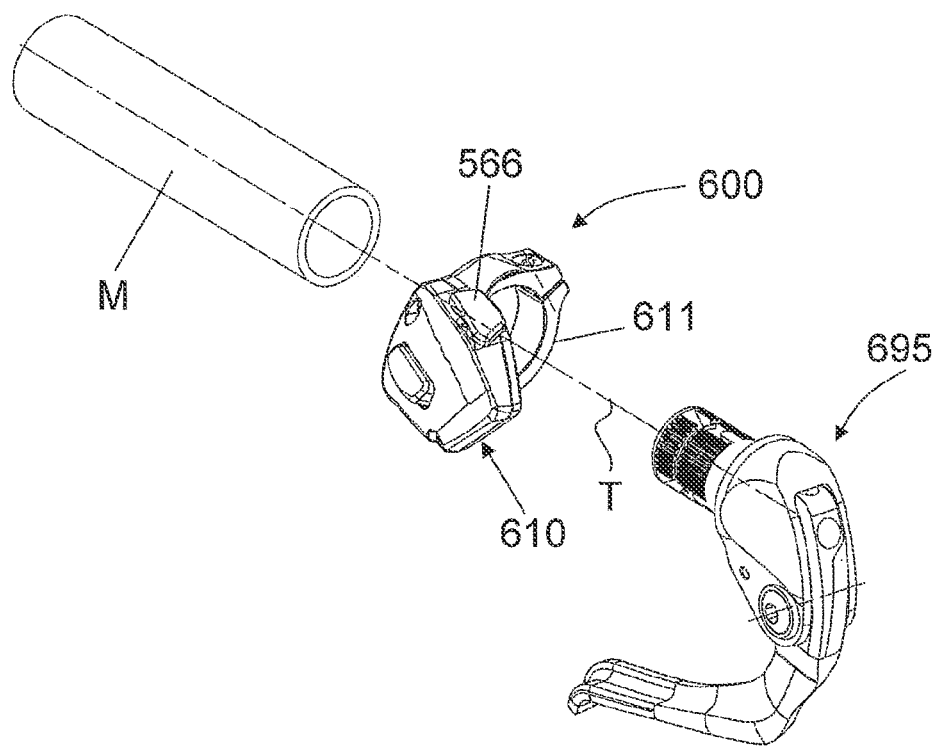
FIG. 21 is an exploded perspective view of the device of FIG. 18.

FIGS. 15 to 17 show an electric actuation device 500 of a competition bicycle gearshift (not shown), in particular for races, according to a fourth embodiment of the invention.

The device 500 comprises a body 510, suitable for being mounted on the end M of handlebars, and an electric actuation unit 520 fixed inside the body with screws 539 and comprising electric actuation members 541 and 551. The body 510 carries a band 590 for fixing the device 500 to the end M of handlebars.

The device 500 differs from the device 100 in that the body 510 comprises a cylindrical through seat 511, see FIG. 17, suitable for receiving, in use, the tubular end M of the handlebars. The cylindrical through seat 511 has an axis S that when the device 500 is mounted on the handlebars M extends in the direction of travel X of the bicycle. The cylindrical seat 511 is configured so as to allow the positioning of the body 510 externally around the tubular end M of the handlebars and to leave free access to the inside of the tubular end M itself. The body 510 extends in the direction of the axis S of the cylindrical through seat 511 substantially as far as the cylindrical seat itself. All of the other characteristics are identical to those of the device 100 and therefore are neither described nor illustrated in detail.

Thanks to this particular configuration of the body 510, it is possible to mount an independent brake lever 595 inside the end M. For this purpose, the brake lever 595 comprises a substantially cylindrical body 596 on which an expander 597 (per se known and not described in detail) is mounted for the insertion and fixing inside the end of handlebars M.

FIGS. 18 to 21 show an electric actuation device 600 of a competition bicycle gearshift (not shown), in particular for races, according to a fifth embodiment of the invention. The device 600 comprises a first and a second electric actuation member, 641 and 651 respectively, and it differs from the device 500 for the different configuration of the body 610 provided with cylindrical through seat 611: the body 610 extends in the direction of the axis T of the cylindrical through seat 611 substantially farther than the cylindrical seat itself, so as to be canti-levered. All of the other characteristics are identical to those of the device 500 and therefore are neither described nor illustrated in detail.

Thanks to this particular configuration of the body 610, it is possible to mount a brake lever 695 inside the tubular end M, so that the brake lever 695 is partially adjacent to the body 610 of the device 600.

What is claimed is:

1. Bar-end electric actuation device of a bicycle gearshift, comprising: a body configured for being mounted at a forward facing free end of handlebars extending in a direction of travel (X) of said bicycle, said body extending forward in said direction of travel (X) when mounted, and two electric actuation members acting on respective electrical contacts which are mounted in said body for controlling gear shifting, upward or downward respectively, wherein said two electric actuation members are mounted on said body with respective facing directions that are perpendicular to a respective surface tangent to said body at a respective electric actuation member, said facing directions are angularly spaced apart by an angle (α) comprised between 60° and 130°; wherein a first one of said two electric actuation members faces upwardly and substantially perpendicular to said direction of travel (X) of said bicycle, and the first one of said two electric actuation members is more forward in said direction of travel (X) of said bicycle than a second one of said two electric actuation members.

2. Device according to claim 1, wherein said angle (α) is comprised between 75 and 110°.

3. Device according to claim 1, wherein one of said facing directions faces laterally, and substantially perpendicular to said direction of travel (X) of said bicycle.

4. Device according to claim 1, wherein one of said facing directions faces in said direction of travel (X) of said bicycle.

5. Device according to claim 1, wherein one of said facing directions faces downwards, and substantially perpendicular to said direction of travel (X) of the bicycle.

6. Device according to claim 1, wherein each of said electric actuation members is actuated from a neutral position to an actuation position according to a respective actuation direction by acting against a respective spring.

7. Device according to claim 6, wherein one of said electric actuation members is mounted on said body to slide in the respective actuation direction.

8. Device according to claim 6, wherein one of said electric actuation members is mounted on said body to rotate about a respective pin arranged so that said respective actuation direction substantially coincides with a respective facing direction of said body.

9. Device according to claim 6, wherein one of said electric actuation members is mounted on said body to rotate about a respective pin arranged so that said respective actuation direction is substantially perpendicular to a respective facing direction of said body.

10. Device according to claim 1, wherein said body further comprises a band for locking said device onto said end of said handlebars.

11. Device according to claim 1, wherein said body further comprises an expander for mounting in said end of said handlebars, and said expander comprising splayable sectors and a free angular space.

12. Device according to claim 1 further comprising a brake lever, rotatably supported by said body.

13. Device according to claim 1, wherein said angle (α) is comprised between 85 and 100°.

14. Bar-end electric actuation device of a bicycle gearshift, comprising a body with a central opening extending between axial ends of the body that is configured to be mounted at an open tubular end of handlebars facing forwards in a direction of travel (X) of said bicycle and electric actuation members mounted on said body, each of said electric actuation members are configured to control gear shifting, upwards and downwards respectively, wherein said body defines a cylindrical through seat having an axis that, when the device is mounted on the open tubular end of the handlebars, extends in said direction of travel (X) of the bicycle, said cylindrical seat being configured to allow a positioning of said body on said open tubular end of said handlebars and retain free, uninterrupted access through a central opening of said body to an inside of said open tubular end.

15. Device according to claim 14, wherein said body extends in a direction of said axis of said cylindrical through seat substantially as far as said cylindrical through seat.

16. Device according to claim 14, wherein said body extends in a direction of said axis of said cylindrical through seat substantially farther than said cylindrical through seat, so as to be cantilevered.

17. A combination comprising:
forward facing bicycle handlebars with a forward facing free end extending in a direction of travel (X) of a bicycle; and,
an electric actuation device for controlling a bicycle gear shift, said device having a body configured for mounting at the forward facing free end of said handlebars and extending forward in said direction of travel (X) when mounted, and
two electric actuation members that are mounted on said body in respective facing directions that are perpendicular to a respective surface tangent to said body at a respective electric actuation member, wherein said facing directions are angularly spaced apart by an angle (α) comprised between 60° and 130°; wherein said electric actuation members act on respective electrical contacts that control upward or downward gear shifting, wherein a first one of said two electric actuation members faces upwardly and substantially perpendicular to said direction of travel (X) of said bicycle, and the first one of said two electric actuation members is more forward in said direction of travel (X) of said bicycle than a second one of said two electric actuation members.

* * * * *